United States Patent [19]
Huijs et al.

[11] Patent Number: 5,919,528
[45] Date of Patent: Jul. 6, 1999

[54] METHOD FOR MANUFACTURING A MINERAL WOOL PRODUCT

[75] Inventors: Mathijs Johannus Anthonius Maria Huijs, Kessel; Jean Marie Wilhelmus Cuypers, Hunsel, both of Netherlands; Thor Husemoen, Roskilde, Denmark

[73] Assignee: Rockwool Lapinus B.V., Netherlands

[21] Appl. No.: 08/894,508

[22] PCT Filed: Feb. 20, 1996

[86] PCT No.: PCT/EP96/00718

§ 371 Date: Nov. 14, 1997

§ 102(e) Date: Nov. 14, 1997

[87] PCT Pub. No.: WO96/26164

PCT Pub. Date: Aug. 29, 1996

[30] Foreign Application Priority Data

Feb. 21, 1995 [EP] European Pat. Off. .............. 95200424

[51] Int. Cl.$^6$ ................................ B05D 1/18; B05D 3/02
[52] U.S. Cl. ..................... 427/389.8; 206/524.1; 65/451; 427/443.2; 524/594; 524/546
[58] Field of Search ...................... 422/389.8; 206/524.1; 427/443.2; 524/594, 546; 65/451

[56] References Cited

U.S. PATENT DOCUMENTS

| | | | |
|---|---|---|---|
| 3,231,349 | 1/1966 | Stalego | 65/3 |
| 3,336,185 | 8/1967 | Helbing . | |

FOREIGN PATENT DOCUMENTS

| | | |
|---|---|---|
| 252867 | 1/1988 | European Pat. Off. . |
| 1353345 | 5/1974 | United Kingdom . |

*Primary Examiner*—Michael Lusignan
*Attorney, Agent, or Firm*—Webb Ziesenheim Logsdon Orkin & Hanson, P.C.

[57] ABSTRACT

The invention relates to a method for manufacturing a product on a basis of mineral wool, including the steps of: i) preparing a phenol-formaldehyde resin, ammonia and a sugar preparation containing aqueous preparation; ii) applying the preparation to the mineral wool; and iii) curing the mineral wool with forming of the product, and to a kit for preparing the mineral wool product, including a container holding the resin preparation and a container holding the sugar preparation.

16 Claims, No Drawings

METHOD FOR MANUFACTURING A MINERAL WOOL PRODUCT

BACKGROUND OF THE INVENTION

1. Field of the Invention

The present invention relates to a method for preparing a mineral wool product. The products according to the invention are intended for use as for instance thermal and fire insulation, fire protection, noise reduction and regulation growth media reinforcement of other materials such as plastics, and fillers. In particular the present invention relates to method for manufacturing a mineral wool product wherein use is made of a phenol-formaldehyde resin as curable binder.

2. Description of Related Art

Resin preparations based on phenol-formaldehyde resin are well known in the art as thermocurable binders. The resin preparation can be used in a non-polymerized or partly polymerized form. The resin preparation is atomized into a gas flow and after contact with mineral fibres is deposited thereon and cured by a temperature treatment, whereby the mineral wool-containing fibres are mutually joined by the cured resin.

The phenol-formaldehyde resin contains both phenol and formaldehyde in a molar ratio of 1:2.8 and more, such as up to 1.6. In general the quantity of formaldehyde is over the stoichiometric amount, such as in the ratio 1:3.1 to 1:5, for instance 1:3.4. The excess of formaldehyde avoids the possibility of phenol remaining present in gaseous form in the gas flow and being emitted to the environment after atomizing of the resin preparation and evaporation of the water present therein.

The resin preparation generally also contains ammonia for the purpose of binding the excess amount of formaldehyde relative to phenol with the formation of ammine compounds such as hexamethyl tetra-ammine.

A drawback to the use of such a phenol-formaldehyde resin and ammonia-containing aqueous preparation is the emission of ammonia in quantities of up to 200 ppm.

The present invention has for its object to provide a solution to this drawback of ammonia emission which is less expensive than the usual method for removing ammonia from gas, for instance by means of using scrubbers. This is however subject to the condition that the curing of the phenol-formaldehyde resin is substantially not adversely affected and the emission of phenol and/or formaldehyde substantially does not increase.

SUMMARY OF THE INVENTION

The invention is based on the insight that the ammonia emission occurring during use of a phenol-formaldehyde resin or binder in preparation of a mineral wool product can be significantly repressed by neutralizing ammonia in the resin preparation by making use of a sugar compound. The sugar compound may added before the binder is ready for use even before the ammonia is added. According to one preparation procedure the addition of this sugar compound takes place before atomizing of the resin preparation, thereby avoiding due to the reaction of ammonia with the sugar compound ammonia eventual neutralisation and thereby reduction of function as resin stabilizer. Addition of the sugar compound during resin preparation is possible. The resin preparation eventually becomes unstable and unsuitable for use as binder for mineral wool. The invention therefore proposes that the sugar compound and/or the ammonia is added to the resin preparation timely before applying of the resin preparation to the mineral wool.

DETAILED DESCRIPTION OF THE PREFERRED EMBODIMENTS

An optimal preparation procedure comprises the addition of the ammonia or ammonium as the last component just before applying the resin based binder to the mineral wool.

The method according to the invention therefore provides for manufacture of a product on a basis of mineral wool, including the steps of:

i) preparing a phenol-formaldehyde resin, ammonia and a sugar preparation containing aqueous preparation;

ii) applying the preparation to the mineral wool; and iii) curing the mineral wool with forming of the product.

In one embodiment the method includes:

i) preparing a phenol-formaldehyde resin and ammonia containing aqueous preparation;

ii) mixing the resin preparation with a sugar preparation;

iii) applying the mixture of the resin preparation and the sugar preparation to the mineral wool; and iv) curing the mineral wool with forming of the product.

In another embodiment the method includes:

i) preparing a phenol-formaldehyde resin and sugar preparation containing aqueous preparation;

ii) mixing the resin preparation with an ammonia containing aqueous preparation;

iii) applying the mixture of the resin preparation and the sugar preparation to the mineral wool; and iv) curing the mineral wool with forming of the product.

Still another embodiment includes:

i) preparing a phenol-formaldehyde resin containing preparation;

ii) mixing the resin preparation with a sugar preparation and with an ammonia containing aqueous preparation;

iii) applying the mixture of the resin preparation and the sugar preparation to the mineral wool; and iv) curing the mineral wool with forming of the product.

It is noted that it is possible in principle to atomize the sugar preparation and the resin preparation separately and apply them to the fibres as long as ammonia can react with the sugar compound before passing to the gas phase. For an optimal process it is however strongly recommended to mix the sugar preparation comprising resin preparation with the ammonia shortly prior to atomizing.

The sugar compound, in general a sugar preparation, can contain any suitable sugar compound, insofar as the sugar compound enters into a reaction with ammonia and does not substantially suppress the action of the resin preparation. Suitable sugar compounds comprise aldoses and ketoses, such as monosaccharides, for instance glucose and fructose, disaccharides such as sucrose, maltose, lactose, oligosaccharides such as syrup, in particular glucose syrup and fructose syrup, and polysaccharides, in particular water-soluble polysaccharides such as dextrin and starch. It is noted that the sugar preparation can contain one or more of these sugar compounds. The sugar preparation can consist of a solid, dispersion but is preferably a solution in water. Optimum mixing with the aqueous resin preparation is thus possible.

The sugar preparation in the form of an aqueous solution generally contains 1–80% by weight, preferably 15–80% by weight, generally 35–75% by weight, for example 50% by weight of the sugar compound in water. The amount of added sugar preparation in relation to the resin preparation is preferably such that the sugar compound is added in a stoichiometric or excess quantity relative to the ammonia, that is, an amount such that the ammonia emission is markedly reduced.

The amount of the sugar compound in the sugar preparation and the amount of the sugar preparation to be used relative to the resin preparation containing this ammonia can be established via routine experiments such that the ammonia emission decreases significantly. Resin preparations and sugar preparations can for instance be used which each contain an equal quantity of resin and sugar, whereby optimum mixing of both preparations is possible at a sufficiently low viscosity.

The present invention likewise relates to a kit which can be used in the preparing of mineral wool products, which kit contains a container with resin preparation and a separate container with sugar preparation as are described above.

Mineral wool products obtained according to the invention comprise rockwool, glass wool, slag wool and mixtures thereof. The fibre length and diameter of the mineral wool fibres are typical for the different types of mineral wool.

If desired, the resin preparation can contain additives for optimal polymerization, such as amides, in particular urea. In respect of urea it is however noted that this has no effect on the ammonia-binding effect of sugar according to the invention because the emission of ammonia does not substantially decrease.

Adhering means and spreading means such as silicone oil and silanes can further be added for optimum adhering and spreading of the resin on the mineral wool fibres.

Mentioned and other features of the method and the kit for preparing mineral wool with use of a phenol-formaldehyde resin wherein the ammonia emission is greatly reduced will be further elucidated hereinbelow with reference to an embodiment which is only given by way of example and which should not be deemed as limiting the invention thereto.

EXAMPLE 1

A conventional resin preparation is made with a molar ratio between phenol and formaldehyde of 1:3.4, catalyst added to pH>8.6. When reaction temperature >80° C. is reached a 50% sugar preparation on basis of a glucose syrup (3% dextrose, 11% maltose, 17% maltotrisose and 69% oligopolysaccharides) is added in an amount of 1 part to 0.77 parts of phenol. When the resin is able to dissolve approximately 8 parts of water to one part of resin, urea is added in an amount of 1 part urea to 1.6 parts of phenol used. The resin is diluted with water to 40% solids and cooled to 20° C. The next day (or week) the catalyst is neutralised, ammonia is added and the resin is further diluted with water to 20% solids. The ammonia is adjusted to reach a water dilutability of about 1 part resin to 3 parts of water. In comparison to a conventional resin preparation without glucose syrup, the ammonia emission is reduced to less than 50 ppm.

EXAMPLE 2

A conventional resin preparation (44% by weight) contained 8% by weight ammonia and 12% urea. This resin preparation is diluted with water to 15% by weight and contains about 3% by weight ammonia. Due to the presence of ammonia the resin preparation is easily water-dilutable and stable in storage. The resin preparation further contains a silane compound.

Separately prepared is a sugar preparation on a basis of a glucose syrup (3% dextrose, 11% maltose, 17% maltotriose and oligopolysaccharides 69%). The glucose syrup is diluted to 15% by weight.

Three parts of the diluted resin preparation and one part of the sugar preparation are mixed together immediately prior to atomizing in the spinning chamber in which mineral wool fibres are spun in conventional manner in an air flow. The mixture of the resin preparation and the sugar preparation is deposited onto the fibres and forms after curing a rigid binding between the mineral wool fibres.

When only the resin preparation is used or after dilution with one part water, the ammonia emission amounts to about 200 ppm. However, when the resin preparation is diluted according to the invention with the sugar preparation the ammonia emission is then reduced considerably to less than 50 ppm.

EXAMPLE 3

A resin is prepared with a molar ratio of phenol to formaldehyde of 1:3.8, and a basic catalyst is added to adjust pH>8.6. When the reaction temperature is above 80° C., a 75% sugar solution is added. The sugar solution is prepared on the basis of glucose syrup (3% dextrose, 11% maltose, 17% maltotriose and 69% oligopolysaccharides). The sugar solution is added to the resin in an amount of 1 part of sugar solution to 0.77 parts of phenol. When the water dilutability of 1 part of resin is 8 parts of water, urea is added: 1 part of urea to 1 part of phenol used.

The resin is then diluted with water to a solid concentration of 40% and the resin is cooled to 20° C. Before the resin is to be applied to the fibres, it is diluted to 20% solids, the applied catalyst is neutralized and ammonia is added to reach a water dilutability of 1 part resin to 3 parts of water.

The ammonia emission from the production of mineral fibres was reduced to less than 30 ppm.

It will be apparent to a skilled person that all kinds of variations in the composition of the resin preparation and the sugar preparation are possible insofar as both preparations first come into mutual contact at a moment such that the resin preparation remains stable, a properly cured resin binder is formed on the fibres and the ammonia emission is decreased considerably. This implies that the amounts of phenol, formaldehydes, ammonia and sugar to be used are mutually adapted by routine experiment into quantities such that according to the invention the phenol emission, the formaldehyde emission and the ammonia emission are greatly reduced.

We claim:

1. A method for manufacturing a product on a basis of mineral wool, comprising:
    i) preparing an aqueous solution comprising a phenol-formaldehyde resin comprising phenol and formaldehyde in a molar ratio of 1:2.8 to 1:6, ammonia and a sugar;
    ii) applying the solution to the mineral wool; and
    iii) applying the solution to the mineral wool to form the product.

2. The method as claimed in claim 1, wherein the step of preparing an aqueous solution comprises the step of mixing an aqueous solution of a phenol-formaldehyde resin and ammonia with an aqueous sugar preparation.

3. The method as claimed in claim 1, wherein the step of preparing an aqueous solution comprises the step of mixing an aqueous solution of a phenol-formaldehyde resin and a sugar with an aqueous ammonia preparation.

4. The method as claimed in claim 1, wherein the step of, preparing an aqueous solution comprises the step of mixing a phenol-formaldehyde resin with an aqueous sugar and ammonia preparation.

5. The method as claimed in claim 1, wherein the aqueous solution contains ammonia in a quantity such that the pH is greater than 7.

6. The method as claimed in claim 1, wherein the pH of the aqueous solution is 8–11.

7. The method as claimed in claim 1, wherein the pH of the aqueous solution is 8–10.

8. The method as claimed in claim 1, wherein the pH of the aqueous solution is 8.5–9.5.

9. The method as claimed in claim 1, wherein the sugar is selected from the group consisting of a monosaccharide, a disaccharide, an oligosaccharide and a polysaccharide.

10. The method as claimed in claim 9, wherein the sugar is selected from the group consisting of glucose, fructose, sucrose,, maltose, syrup, molasses and dextrin.

11. The method as claimed in claim 1, wherein the sugar added to the aqueous solution is a 1–80% by weight aqueous sugar solution.

12. The method as claimed in claim 1, wherein the sugar added to the aqueous solution is a 15–80% by weight aqueous sugar solution.

13. The method as claimed in claim 1, wherein the sugar is added to the aqueous solution in a stoichiometric or excess quantity relative to ammonia.

14. The method as claimed in claim 2, wherein the aqueous solution of a phenolformaldehyde resin and ammonia is mixed with the aqueous sugar preparation when use of the resulting aqueous solution is imminent.

15. The method as claimed in claim 3, wherein the aqueous solution of a phenolformaldehyde resin and a sugar is mixed with the aqueous ammonia preparation when use of the resulting aqueous solution is imminent.

16. A kit for preparing a mineral wool product, comprising a container holding an aqueous solution of ammonia and a phenolformaldehyde resin comprising phenol and formaldehyde in a molar ratio of 1:28 to 1:6, and a container holding an aqueous sugar solution.

* * * * *

UNITED STATES PATENT AND TRADEMARK OFFICE
CERTIFICATE OF CORRECTION

PATENT NO. : 5,919,528
DATED : July 6, 1999
INVENTOR(S) : Mathijs Johannus Anthonius Maria Huijs et al.

It is certified that error appears in the above-identified patent and that said Letters Patent is hereby corrected as shown below:

Column 1 Line 27 "1.6" should read --1:6--.

Claim 4 Column 5 Line 1 after "step of" delete comma --,--.

Claim 10 Column 5 Line 19 "sucrose,," should read --sucrose,--.

Signed and Sealed this

Twenty-fifth Day of January, 2000

Attest:

Attesting Officer

*Acting Commissioner of Patents and Trademarks*